No. 686,838.

R. APPEL.
FLAYING KNIFE.
(Application filed July 2, 1901.)

(No Model.)

Patented Nov. 19, 1901.

2 Sheets—Sheet 1.

WITNESSES:
Izabella Waldron
Adelaide C. Gleason.

INVENTOR.
Richard Appel
BY
ATTORNEYS.

THE NORRIS PETERS CO., PHOTO-LITHO., WASHINGTON, D. C.

No. 686,838. Patented Nov. 19, 1901.
R. APPEL.
FLAYING KNIFE.
(Application filed July 2. 1901.)
(No Model.) 2 Sheets—Sheet 2.
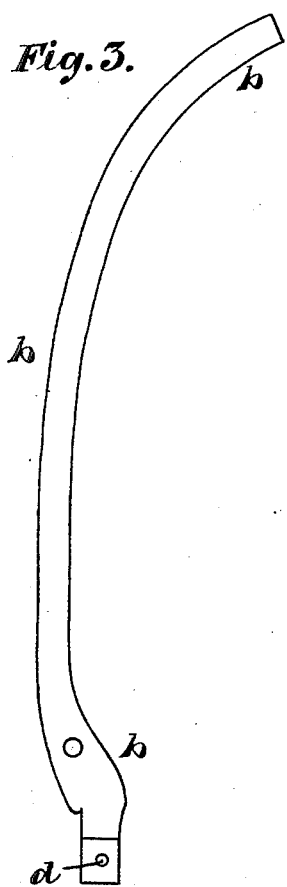
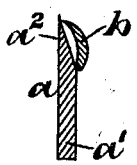
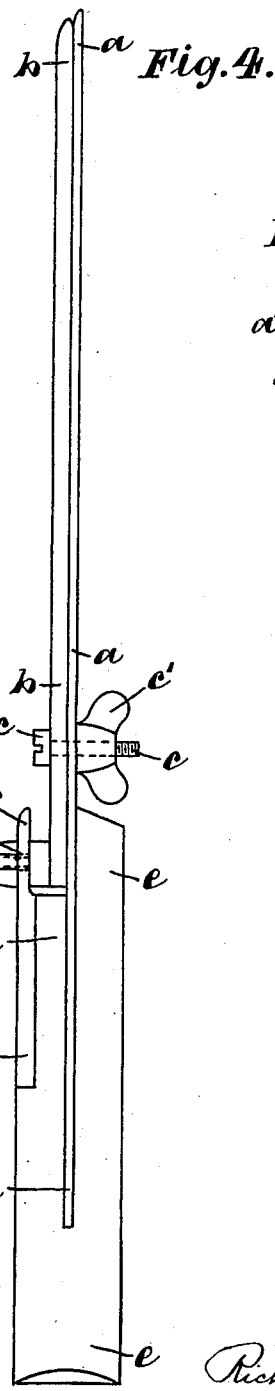
WITNESSES:
Isabella Waldron
Adelaide C. Gleason
INVENTOR
Richard Appel
BY
Richard
ATTORNEYS
THE NORRIS PETERS CO., PHOTO-LITHO., WASHINGTON, D. C.

UNITED STATES PATENT OFFICE.

RICHARD APPEL, OF FRANKFORT-ON-THE-MAIN, GERMANY.

FLAYING-KNIFE.

SPECIFICATION forming part of Letters Patent No. 686,838, dated November 19, 1901.

Application filed July 2, 1901. Serial No. 66,873. (No model.)

*To all whom it may concern:*

Be it known that I, RICHARD APPEL, manufacturer, a subject of the Emperor of Germany, and a resident of Bockenheim, Frankfort-on-the-Main, in the Empire of Germany, have invented a new and useful Improved Flaying-Knife, of which the following is a specification.

In skinning or flaying animals it is of the greatest importance that the knife used for this purpose does not penetrate into the skin, as a skin into which cuts have been made by the skinner when taking it off the animal's back becomes inferior in quality, and its value is reduced from fifteen to twenty-five per cent., according to the number of cuts made into it, which in a single heavy ox-hide alone means a loss of from six to ten shillings. Many thousands of pounds sterling are lost annually to the producers of hides, butchers, tanners, leather manufacturers, and others by skins thus rendered inferior, and various knives have been constructed to prevent these cuts. Some of these knives have been provided with a protector on one or on both sides of the blade; but none of them up till now have proved successful, and every one of them had the disadvantage that after they were ground once or twice they were useless. My invention, however, relates also to this kind as well as to other kinds of flaying-knives—viz., to knives having a protector lying opposite the edge of the blade. In the knives hitherto known the chance of the knife entering the skin was only removed in a small degree, as the blades of these knives were mostly ground evenly on both sides toward the edge in such a way that they had not the desired tendency to turn away from the skin, and the thicker the knives were in the back the more this defect was felt and the more slanting, therefore, were both sides of the knives toward the cutting edge. This evil has been obviated and removed by my invention, which is illustrated in the accompanying drawings, in which—

Figure 1:
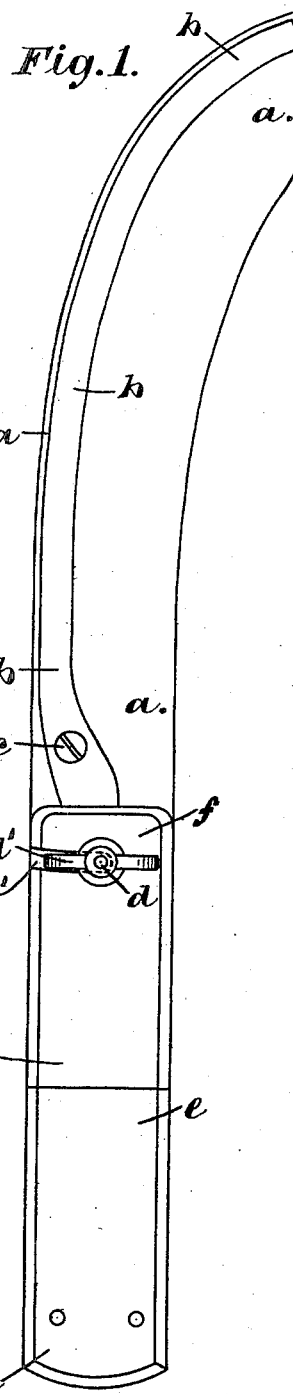
Figure 2:
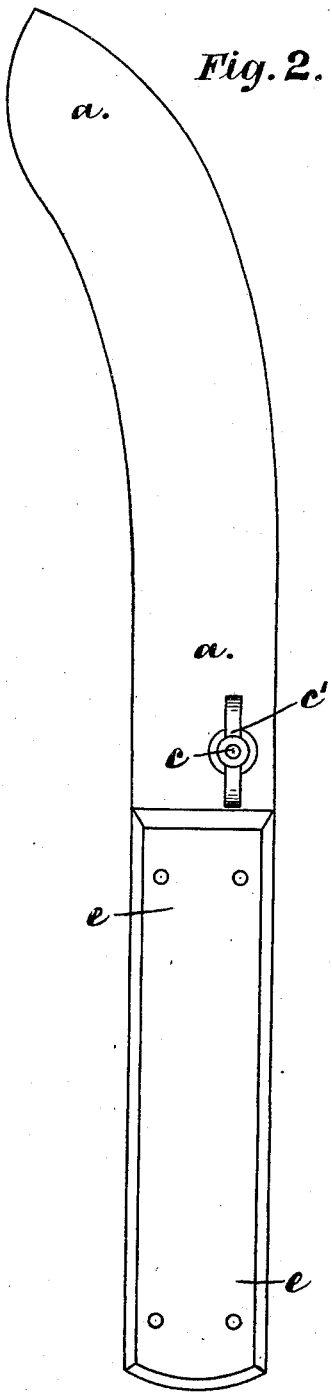

Figure 1 is a side view showing the side which lies next the skin when in use. Fig. 2 shows the opposite side, and Fig. 3 is a view of the guard or protector detached. Fig. 4 is a back edge view of the knife, and Fig. 5 is a cross-section through the blade with the protector on it.

In the drawings, $a$ is the blade proper.

$b$ is the protector or guard, and $c$ and $d$ are two bolts, with wing-nuts $c'$ and $d'$, respectively, for fastening the protector to and holding it on the blade.

$e$ is the handle of the knife, and $f$ is a plate on one side through which bolt $d$ passes and onto which the wing-nut $d'$ bears or works.

The blade $a$ is thick at the back edge $a'$, and this thickness does not diminish on either side toward the edge $a^2$. The edge consists of a plain strong bevel extending forward toward the edge from the side which is away from the animal being skinned to the other side, so that the side which lies toward the flesh side of the animal in the operation of skinning is flat and at right angles to the back edge $a'$ and the other side is at least parallel with it, or it may be inclined outward somewhat, as stated, making it thicker at the point from which the bevel edge starts. By this construction the knife in itself is furnished with a tendency to turn away from the skin, and this tendency and effect is accentuated or assisted by the peculiarly-constructed form of the protector $b$, which lies over its edge bevel, as shown.

To prevent fibers and other extraneous matters getting in between the edge of the blade $a$ and the protector $b$, which would render good cutting impossible, to increase the tendency of the knife to turn away from the skin, and to prevent the cutting into the skin, even when the edge of the knife is pressed onto it, the protector $b$ is concave on the inner side next the bevel, which it covers, and convex or arched on the outer side. This form of protector enables it to fit closely with both its edges on the knife, which accomplishes the effect as regards its automatic tendency to turn away from the skin and prevent the entrance of fibers and other matters between itself and the blade-bevel, and this construction generally has the further advantage that when grinding becomes necessary the knife only requires to be ground on the one side, and it can be ground as often and as far as it is practically possible to grind any knife.

The protector in one form consists of a two-armed lever, and when in place on the bevel the bolt c constitutes the fulcrum about which it is free to be turned. The bolt d is fixed in the shorter arm of this protector, and it passes through the gap f' in the plate f. When the protector has been set or adjusted to the position required in relation to the cutting edge of the blade—that is, with a broader or narrower portion of the cutting edge projecting beyond the edge of the protector—it is fastened and held there by screwing up the wing-nuts d' and c'.

What is claimed in respect of the herein-described invention is—

1. A flaying-knife blade comprising a long even bevel edge, and an even plane surface behind it and extending to the back, on the side adapted to lie next the skin when in use, and an even plane surface at the other side throughout; and a protector-bar b of an arched form in cross-section, the forward edge of said bar resting on the blade-edge bevel near the cutting edge, and the arched back projecting upward from the bevel, and adapted to be presented to the skin when in use; substantially as herein set forth.

2. A flaying-knife comprising a blade a of equal thickness having a plane bevel at the cutting edge, and an even plane surface extending from the back edge of the bevel to the back of the blade, and a plane even surface throughout at the opposite side, substantially parallel with the former surface; and a protector-bar b concave on its inside, and convex on its outside, the leading edge bearing upon the bevel of the blade edge near the cutting edge, and the back edge of the protector resting on the outer surface, and said bar being held on the blade by bolts c and d, and nuts c', d', as set forth.

In witness whereof I have hereunto set my hand in presence of two witnesses.

RICHARD APPEL.

Witnesses:
 JEAN GRUND,
 CARL GRUND.